(12) United States Patent
Segman

(10) Patent No.: US 6,301,619 B1
(45) Date of Patent: Oct. 9, 2001

(54) SYSTEM AND METHOD FOR PROVIDING SERVICE OF SENDING REAL TIME ELECTRONIC INFORMATION TO SELECTED INDIVIDUAL VIEWERS OF TRANSMITTED VIDEO OR COMPUTERIZED SIGNALS

(75) Inventor: Yosef Segman, Zichron Yaacov (IL)

(73) Assignee: Oplus Technologies LTD, Haifa (IL)

( * ) Notice: Subject to any disclaimer, the term of this patent is extended or adjusted under 35 U.S.C. 154(b) by 0 days.

(21) Appl. No.: 09/260,035

(22) Filed: Mar. 2, 1999

(51) Int. Cl.$^7$ ..................................................... G06F 15/16
(52) U.S. Cl. .......................... 709/231; 709/206; 709/217; 709/218; 709/219; 725/46
(58) Field of Search ..................................... 709/231, 217, 709/218, 219, 206; 345/327, 328; 348/7, 10, 12, 13, 468; 710/163; 705/26, 27, 10; 725/2, 9, 20, 106, 91, 105, 110, 112, 115, 46

(56) References Cited

U.S. PATENT DOCUMENTS

| | | | |
|---|---|---|---|
| 5,534,913 | * | 7/1996 | Majeti et al. .......................... 725/114 |
| 5,636,346 | * | 6/1997 | Saxe ......................................... 705/1 |
| 5,710,887 | * | 1/1998 | Chelliah et al. ......................... 705/26 |
| 5,721,827 | * | 2/1998 | Logan et al. .......................... 709/217 |
| 5,754,939 | * | 5/1998 | Herz et al. .......................... 455/3.04 |
| 5,809,483 | * | 9/1998 | Broka et al. ............................. 705/37 |
| 5,950,172 | * | 9/1999 | Klingman ................................. 705/26 |
| 5,992,888 | * | 11/1999 | North et al. ............................. 283/56 |
| 6,009,410 | * | 12/1999 | LeMole et al. .......................... 705/14 |
| 6,026,369 | * | 2/2000 | Capek ..................................... 705/14 |

* cited by examiner

Primary Examiner—Robert B. Harrell
Assistant Examiner—William C. Vaughn, Jr.
(74) Attorney, Agent, or Firm—Mark M. Friedman

(57) ABSTRACT

A system and method for providing service of sending real time electronic information to selected individual viewers of transmitted video or computerized signals. The system of individual features five main areas of components: (1) viewer, (2) viewer display device such as a television, including an electronic device featuring signal recognition and signal decoding capabilities critical to implementation of the system, (3) service center, (4) providers of video or computerized signals, and (5) sender. The method for implementing the system of the invention features five principle steps: (1) initialization of system, (2) activation of system by sender of electronic information, (3) viewer reception, recognition and decoding of a transmitted compound video or computerized signal, featuring (i) the regularly transmitted video or computerized signal, (ii) subset viewer attribute information, (iii) encoded sender requested electronic information, and (iv) formatting of sender requested electronic information, (4) display of sender requested electronic information, formatted in a subwindow of display device of viewer television and (5) viewer response, in real time, back to provider, according to a fully interactive information system. This invention gives providers or senders of electronic information to effectively target, monitor, record, and service selected individual viewers of video or computerized signals, during real time, whereby such a system and method are based on obtaining results with high accuracy, and which are cost effective to implement.

16 Claims, 2 Drawing Sheets

SYSTEM AND METHOD FOR PROVIDING SERVICE OF SENDING REAL TIME ELECTRONIC INFORMATION TO SELECTED INDIVIDUAL VIEWERS OF TRANSMITTED VIDEO OR COMPUTERIZED SIGNALS

FIELD AND BACKGROUND OF THE INVENTION

The present invention relates to providing an electronic service to viewers of transmitted video or computerized signals, and more particularly to a system and method for providing service of sending real time electronic information to selected individual viewers of transmitted video or computerized signals.

An important aspect of the 'information superhighway' features viewers receiving transmitted signals from senders via a provider of video or computerized signals. Hereinafter, the term electronic information refers to any type and form of information which can be transmitted and received as video or computerized signals (e.g., via standard or cable TV, or, via computer), from a provider (e.g., standard or cable TV station, or internet service provider (ISP) of video or computerized software signals, to viewers capable of receiving and displaying such transmitted video or computerized software signals (e.g., via television sets, or computers with a display screen). Lately, computerized software signals are capable of including video data, such that a computer with a display screen is also capable of receiving and displaying video data.

The objective of viewers receiving transmitted video or computerized signals is to have access to electronic information contained in the transmitted signals. Ordinarily, viewers are given access to electronic information (e.g., in the form of TV programs, internet web sites, personal messages) made available and transmitted by a sender utilizing services of a provider. Details of content and format of electronic information provided to viewers are chosen either by a provider or by a sender (i.e., an entity, e.g., an individual or an entire company, which uses provider services for transmitting electronic information to viewers, usually for a monetary charge), based on criteria relevant to the provider or the sender, for purposes of maintaining a business, institution, governmental function, organization, or personal relationship, which includes among its activities or characteristics, a function for sending electronic information to viewers.

A significant limitation in current systems and methods of the relationship between providers or senders, and viewers of video or computerized signals, is that, except for electronic mail (e-mail), they are ordinarily based on essentially a 'one-way street', especially with respect to real viewing time, whereby, electronic information is initiated and sent by a sender to all potential viewers of a sender's TV station of internet provider, without the ability to transmit electronic information in a discriminatory manner to specifically targeted or selected individual viewers of that provider (sender). Moreover, using current systems and methods of indiscriminately sending electronic information limits a provider (sender) from having the ability to receive feedback response, during real time, from selected individual viewers of transmitted video or computerized signals.

There is thus a need for, and it would be useful to have a system and a method that enable a provider or sender to transmit electronic information, during real viewing time or not, to selected individual viewers of transmitted or computerized signals.

Typically, criteria used by providers or senders for deciding on content and format of information transmitted to viewers are based on information coming from three sources: (1) viewers, (2) advertisers (e.g., advertising companies), and (3) marketers (e.g., marketing companies). Viewers are ultimate end-users of transmitted video and computerized electronic information, whereas advertisers and marketers supply information to providers or senders, based on market segments made up of selected individual viewers exposed to advertisements, for the main objective of advertising or marketing to viewers. Thus, criteria used by providers or senders for deciding on content and format of information transmitted to viewers ultimately originates from the viewers themselves. These criteria are defined with respect to qualified or characteristic information about viewers, for the purpose of fulfilling or satisfying viewer interests, pleasures, requests, or specific needs. Hereinafter, viewer interests, pleasures, requests, or specific needs are collectively considered here as part of a set of viewer attribute information. Viewer attribute information may also include demographic and personal information and details about viewers, such as names of viewers, locations of viewers, activities, lifestyles, likes, dislikes, habits, hobbies, etc. According to identified viewer attribute information, providers or senders match resources available to them for transmission of video or computerized electronic information to their selected viewer audience. Viewer attribute information may be obtained either directly by sender providers, or by senders themselves such as advertisers and marketers, who in turn typically supply the information to providers.

Providers or senders of electronic information identify viewer attribute information by using various different methods and techniques, usually involving some form of market research. Market research techniques used by providers or senders for obtaining viewer attribute information, include the usage of provider or sender designed surveys, questionnaires, and interviews, of viewers, by contacting viewers through in-person, telephone, surface mail, or electronic means, such as electronic mail (e-mail), or by inserting the attribute information to a memory device located within the display device or to a set-top box located outside the display device. Providers or senders also obtain viewer attribute information by other electronic means, such as electronic monitoring or tracking of selected provider transmissions seen by viewers.

In the transmission of video signals to TV viewers, electronic monitoring or tracking of provider or sender transmissions sent to viewers involves connection of electronic black boxes to TVs, which identify viewing habits including, for example, categories or specific TV programs viewed, frequency of viewing, and times of viewing. TV program ratings are based on this kind of electronic monitoring of viewers. Results of TV program ratings are used by TV stations (and TV advertisers) for deciding upon content and format of information to be provided to TV viewers. In the transmission of computerized electronic information to viewer computer displays, a similar form of electronic monitoring, for example, involves internet Web site visit counters, which count the number of viewer visits to a particular Web site transmitted through the internet. Results of Web site visit counters are used by internet service providers and users, such as internet advertisers, for deciding upon content and format of information to be transmitted to internet viewers.

With respect to effectively servicing or targeting viewers, using market research techniques and results obtained therefrom, although quite developed and sophisticated, have several significant limitations which have not yet been overcome. Market research techniques, used by providers for obtaining viewer attribute information, are typically applied to entire viewer populations, of relatively large sizes, at the same time, during a specific time period, and not to selected individual viewers on a case by case basis, during real viewing time. Population size may be hundreds, thousands, tens of thousands, or higher, of viewers of video or computerized electronic information. Statistical analyses are performed on the raw data of surveys, questionnaires, interviews, and electronic monitoring, of entire populations of viewers, and not of individuals. Results of these statistical analyses, providers of video or computerized electronic information to design transmission criteria in a statistical, not individualized, fashion, thereby, transmitting to statistically based viewer populations sharing viewer attribute information in a statistical, not individualized, fashion. Moreover, these results are dated, during a specified viewing time period, which may be of several weeks or months, for example. After periods of several months, and especially of several years, accuracy of such results decreases as viewer attribute information changes, for both individual viewers and large populations of viewers. Thus, results of such market research techniques are of limited value to providers or senders of electronic information, such as advertisers and marketers, desiring to efficiently transmit individualized electronic information to large numbers of selected individual viewers on an individualized basis, during real viewing time.

Current techniques and results of electronic monitoring of internet viewers, for the purpose of effectively servicing or targeting selected individual viewers by internet service providers of users, are less developed and more limited than those of electronic monitoring of TV viewers. Principle among these are Web site counters, which simply count, electronically, the number of times any internet viewer visits, or 'hits', a particular Web site. Web site counters are anonymous, unattached from internet viewer demographics, and being unrelated to viewer personal names, e-mail names or addresses, and other useful individualized viewer attribute information. Individualized viewers attribute information, such as internet usage habits, including, for example, categories of internet Web sites viewed, frequency of viewing, and times of viewing, relating to an individual internet viewer, are not ordinarily electronically recorded. An additional significant limitation compared to electronic monitoring of TV viewers is that, ordinarily, for a particular Web site having its own site counter, counter data obtained is applicable only to that particular Web site, and not to the usual plethora of Web sites accessible to internet viewers by internet service providers or users. Provider or user initiated methods of connecting electronic black boxes to individual internet viewer displays, in order to monitor an individual's internet viewer usage habits relating to a multitude of Web sites visited by that individual viewer, during real viewer time or over extended periods of time, have not yet been developed to the extent of electronic monitoring TV viewers. Moreover, obtaining internet viewer ratings information analogous to TV viewer ratings information is not yet possible, also due to the huge number of internet Web sites compared to a smaller number of TV channels, and also due to the nature of internet viewers 'surfing' the internet, where for example, internet viewers often surf from the internet Web site to another in a time period of seconds, without investing sufficient time required for recording accurate ratings information. Such electronic monitoring techniques, and results obtained therefrom, represent very inefficient and low accuracy means for internet service providers to propose criteria for deciding on content and format of electronic information transmitted to viewers.

There is thus a need for, and it would be useful to have a system and a method that are capable of being used by providers or senders of electronic information to effectively monitor, record, and service viewer attribute information of selected individual viewers of video or computerized signals, during real time, whereby such a system and method are based on obtaining results with high accuracy, and which are cost effective to implement.

SUMMARY OF THE INVENTION

The present invention relates to providing an electronic service to viewers of transmitted video or computerized signals, and more particularly to a system and method for providing service of sending real viewing time electronic information to selected individual viewers of transmitted video or computerized signals.

The system and method of the present invention features a unique electronic device which has the capability of selectively recognizing electronic information sent by a sender to one or more viewers, where sender electronic information is an additional component of, and is included in, the same video or computerized signal regularly transmitted by a provider to the viewers. Recognition by the electronic device is based on a decision step involving matching viewer attribute information previously stored in the electronic device, by the viewers, to a subset of viewer attribute information included in the electronic information being sent to the viewers by request of the sender, via a provider of transmitted video or computerized signals to the viewers.

The system and method of the present invention enable a sender to send real time electronic information to selected individual viewers of regularly transmitted video or computerized signals. Sender electronic information conveniently 'piggy-backs' on regularly transmitted video or computerized signals being sent to one or more selected individual viewers, during real time, in contrast to current communication systems and methods, where sender electronic information is either transmitted to individual viewers separate from regularly transmitted video or computerized signals to the viewers, or is sent to all the viewers of a provider, in a non-discriminatory mode, where sender electronic information may have something in common with only a fraction of targeted viewer attribute information, and therefore, have something in common with only a fraction of all targeted viewers.

An additional benefit of the system and method of the present invention is that, as a result of enabling providers to target selected individual viewers via matching of viewer attribute information, whereby provider transmissions of video and computerized signals are sent and selectively recognized, with essentially perfect accuracy, to those selected individual viewer display devices, they offer providers of electronic information the opportunity to more effectively monitor, record, and service selected individual viewer activity of video of computerized signals, during real time, in a way of obtaining results with high accuracy, and which are cost effective to implement. This benefit is extremely valuable to senders of electronic information to large groups of potentially targeted viewers, e.g., advertisers or marketers sending electronic information to large groups of potential customers viewing their products or ads.

Currently, such a highly accurate system or method for targeting selected individual viewers of transmitted video or computerized signals, during real time, is not available.

A preferred embodiment of a system for providing service of sending real time electronic information to selected individual viewers of transmitted video or computerized signals of the present invention features the following five main areas of components: (1) viewer, (2) viewer display device such as a television, including an electronic device critical to implement of the system, (3) service center, (4) providers of video or computerized signals, and (5) sender, whereby each area further includes components required for implementation of the system and method of the present invention.

A preferred embodiment of a method for implementing the system for providing service of sending real time electronic information to selected individual viewers of transmitted video or computerized signals of the present invention features the following five principle steps: (1) initialization of system, (2) activation of system by sender of electronic information, (3) viewer reception of a transmitted compound video or computerized signal, (4) display of compound video or computerized signal, featuring sender requested electronic information, and (5) viewer response, in real time, back to provider, according to a fully interactive information system.

According to the present invention, there is provided a system for providing service of sending real time electronic information to a selected individual viewer of transmitted video or computerized signals, the system comprising: (a) a set of viewer attribute information related to the selected individual viewer; (b) an electronic device in communication with a display device of the selected individual viewer for receiving and storing the set of viewer attribute information; (c) electronic information of a sender to be transmitted to the selected individual viewer, the electronic information of the a sender including a subset of the set of viewer attribute information related to the selected individual viewer; (d) a service center for communicating to a provider of transmitted video or computerized signals encoding instructions to form encoded electronic information of the sender: (e) the provider of transmitted video or computerized signals for transmitting the encoded electronic information of the sender to the electronic device in communication with the display device of the selected individual viewer; (f) the electronic device for recognizing the encoded electronic information of the sender by matching elements of the subset of the viewer attribute information to the elements of the set of viewer attribute information related to the selected individual viewer, and for decoding the encoded electronic information of the sender to form decoded electronic information of the sender; and (g) a subwindow within the display device of the selected individual viewer for displaying the decoded electronic information of the sender.

According to the present invention, there is provided a method of providing service of sending real time electronic information to a selected individual viewer of transmitted video or computerized signals, the method comprising the steps of: (a) providing a set of viewer attribute information related to the selected individual viewer; (b) receiving and storing the set of viewer attribute information by an electrode device in communication with a display device of the selected individual viewer; (c) providing electronic information of a sender to be transmitted to the selected individual viewer, the electronic information of the sender including a subset of the set of viewer attribute information related to the selected individual viewer; (d) providing a service center for communicating to a provider of transmitted video or computerized signals encoding instructions to form encoded electronic information of the sender; (e) transmitting the encoded electronic information of the sender by the provider of transmitted video or computerized signals to the electronic device in communication with the display device of the selected individual viewer; (f) recognizing the encoded electronic information of the sender by the electronic device in communication with the display device of the selected individual viewer, whereby the electronic device recognizes the encoded electronic information of the sender by matching elements of the subset of the viewer attribute information to the elements of the set of viewer attribute information related to the selected individual viewer; (g) decoding the encoded electronic information of the sender by the electrode device in communication with the display device of the selected individual viewer to form decoded electronic information of the a sender; (h) formatting decoded electronic information of the sender by the electronic device in communication with the display device of the selected individual viewer to form formatted decoded electronic information of the sender; (i) opening up of a subwindow within the display device of the selected individual viewer; and (j) displaying the formatted decoded electronic information of the sender within the subwindow within the display device of the selected individual viewer.

Several steps of the present invention could be implemented by hardware or by software on any operating system of any firmware or a combination thereof. For example, as hardware, indicated steps of the invention could be implemented as a chip or a circuit. As software, indicated steps of the invention could be implemented as a plurality of software instructions being executed by a computer using any suitable operating system. In any case, indicated steps of the method of the invention could be described as being performed by a data processor, such as a computing platform for executing a plurality of instructions, regardless of the implementation of the present invention.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and method for providing service of sending real time electronic information to selected individual viewers of transmitted video or computerized signals.

The components and operation of the system and method for providing service of sending real time electronic information to selected individual viewers of transmitted video on computerized signals according to the present invention are better understood with reference to the drawings and the accompanying description. It is to be noted that illustrations of the present invention shown here are for illustrative purposes only and are not meant to be limiting.

For example, the system and method of the present invention could be applied to (a) a single sender requesting to send electronic information via a provider of video or computerized signals to a single viewer having a display device capable of receiving and displaying the new signal including the sender's electronic information, or, could be applied to (b) a single sender and a plurality of viewers, or, could be applied to (c) a plurality of senders and a single viewer, or, could be applied to (d) a plurality of senders and a plurality of viewers. For illustrative purposes in the following drawings and accompanying description, case (a), featuring a single sender and a single viewer, is referred to with respect to the present invention. Where appropriate, for comparative purposes, mention of cases (b), (c), and (d) may appear in the description.

Figure 1:
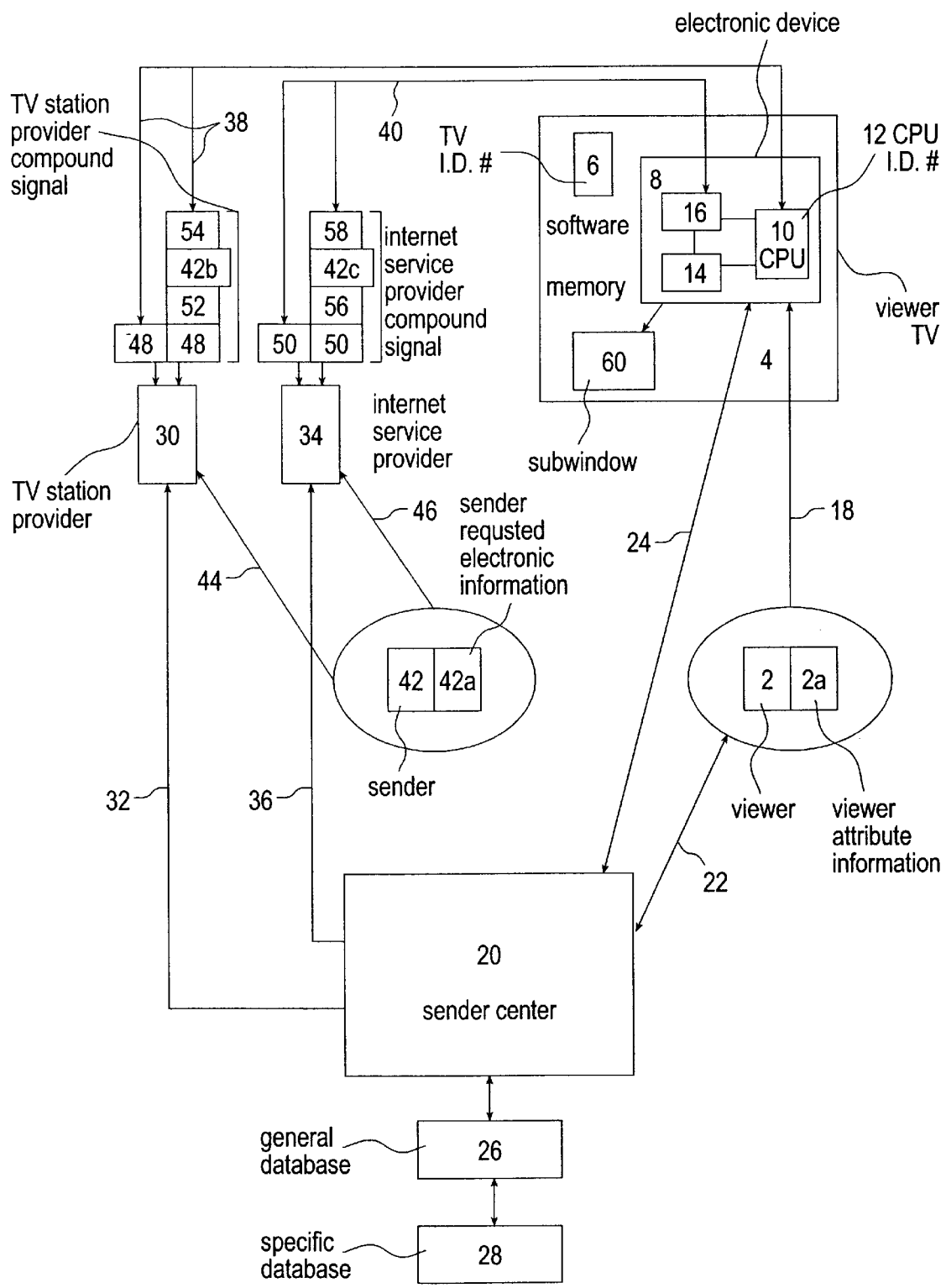
FIG. 1 is a schematic diagram illustrating an exemplary system according to the present invention.

Referring now to the drawings, FIG. 1 is a schematic diagram illustrating an exemplary system according to the present invention. Exemplary system 1 features five main areas of components, (1) viewer 2, (2) viewer device 4 including an electronic device 8 critical to implementation of the system, (3) service center 20, (4) providers of video or computerized signals 30 and 34, and (5) sender 42, whereby each main area further includes components required for implementation of the system and method of the presentinvention.

In FIG. 1, viewer 2 represents an individual viewer or a group, e.g., a family, of more than one viewer, associated with a single viewer television 4. Viewer 2 features viewer attribute information 2a, related to the individual viewer, or to the just described group of viewers. Viewer attribute information 2a include personal, demographic, and equipment related information about viewer 2, which is to be used as criteria for viewer television 4 to recognize and receive, or, to not recognize and send back, transmitted video or computerized signals. For example, viewer attribute information 2a may include detailed information such as name of viewer 2, location of viewer 2, identification number of viewer television or a component of viewer television, activities, lifestyles, likes, dislikes, habits, hobbies, interests, pleasures, requests, specific needs, etc., of viewer 2.

In the present invention, television 4 features a display screen (not shown) capable of receiving and displaying video and/or computerized signals. For example, display screen of television 4, in addition to displaying TV station signals, could be used as a computer display to display computerized signals. Moreover, display screen of viewer television 4 has the capability of displaying terminal video or computerized electronic information in a subwindow 60. In a preferred embodiment of the system of the present invention, television 4, identified by a serial or TV I.D. number 6, includes electronic device 8. In an alternative preferred embodiment (not shown) of the system of the present invention, electronic device 8 is located outside of viewer television 4, and is in direct electronic communication with viewer television 4. For example, electronic device 8 could be located outside of, and in the immediate vicinity of viewer television 4, or alternatively, located elsewhere, for example, at the site of service center 20.

Electronic device 8 includes central processing unit (CPU) 10, where CPU 10 features identification number (I.D. number) 12. Electronic device 8 also includes memory unit 14, and software package 16. Memory unit 14 stores viewer attribute information 2a, to be recalled upon reception by viewer television 4 of transmitted signals sent by a sender. Memory unit 14 also stores electronic information sent by a sender 42 via provider 30 or 34 of transmitted video or computerized signals. Electronic device 8 has the capability of recognizing and decoding coded electronic sent to it by a provider 30 or 34 of transmitted video or computerized signals. Viewer 2 is in communication with electronic device 8 via electronic connection 18, enabling direct input of viewer attribute information into viewer television 4.

Viewer 2 is in communication with service center 20 via electronic connection 22, where electronic connection 22 could be in a telephone, fax, letter, or electronic mail (e-mail) connection, enabling contact between viewer 2 and either personnel or electronic equipment of service center 20. Service center 20 primarily serves providers of transmitted video or computerized signals 30 or 34 by providing them with codes required for transmitting sender requested electronic information as part of regularly transmitted video or computerized signals. Service center 20 includes general database center 26, and specific database 28, where specific database 28 enables the storing of viewer attribute information 2a, such as CPU I.D. number 12 of electronic device 8, included in television 4 belonging to viewer 2. Via electronic connection 22, viewer 2 has the option of providing viewer attribute information 2a to service center 20. Alternatively, television electronic device 8 is in communication with service center 20 via electronic connection 24, enabling direct sending of CPU I.D. number 12 or any other viewers attribute information 2a from electronic device 8 to service center 20.

Service center 20 is also in communication with providers of transmitted video or computerized signals, including TV station provider 30, via electronic connection 32, and internet service provider 34, via electronic connection 36. Electronic connection 32 or electronic connection 36 could be a telephone, fax, letter, or electronic mail (e-mail) connection, enabling contact between either personnel or equipment of service center 20 and either personnel or electronic equipment of provider 30 or 34.

TV station provider 30 or internet service provider 34, or both, are in communication with electronic device 8 of television 4 belonging to viewer 2, via electronic connections 38 and 40, respectively. TV station provider 30 transmits video or computerized signals 48 to electronic device 8, during regular on-going provider service in viewer 2. Alternatively, internet service provider 34 transmits video or computerized signals 50 to electronic device 8, during regular on-going provider service to viewer 2. Transmitted signals 48 or 50 serve as vehicles for providers 30 or 34, respectively, to transmit sender requested electronic information in addition to, and included with provider regular transmission of video or computerized signals, in the form of 'compound' transmitted video or computerized signals.

Sender 42 is any entity, e.g., an individual sender, or a group of senders such as a company or other organization, desiring to be provided with service of sending real time sender requested electronic information 42a to selected individual viewers of transmitted video or computerize signals according to the present invention. Sender requested electronic information 42a is any form or combination of video or computerized electronic information, to be sent to viewer 2, in addition to, and included with, regular transmission of video or computerized signals to viewer 2 by TV station provider 30 or internet service provider 34. Sender 42 has capability of being in communication either with TV station provider 30 via electronic connection 44, or with internet service provider 34 via electronic connection 46, for the purpose of ordering the transmission of sender requested electronic information 42a, Electronic connection 44 of electronic connection 46 could be a telephone, fax, letter, or electronic mail (e-mail) connection, enabling contact between either personnel or equipment of sender 42 and either personnel or electronic equipment of provider 30 or 34. In an alternative embodiment of the system of the present invention, sender 42 could be in direct communication (not shown) with service center 20, for the purpose of placing requests for transmission of sender requested electronic information 42a to viewer 2, via service center 20, in addition to, or instead of, via TV station or internet service provider 30 or 34, respectively.

As described below in a preferred embodiment of the method of the present invention, TV station provider 30 or internet service provider 34 includes sender requested electronic information 42a in addition to, and included with, regular transmission of video or computerized signals 48 or 50, respectively, to viewer 2. Upon activation of system 1, for transmitting sender requested electronic information 42a, TV station provider 30, adds to regular transmitted video or computerized signal 48, the following electronic information: a subset 52 of viewer attribute information 2a, encoded form 42b of sender requested electronic information 42a, and format information 54 for formatting sender requested electronic information 42a. Thus, TV station provider 30 transmits a compound video or computerized signal, indicated in this description as TV station provider compound signal (48+52+42b+54). Alternatively, internet service provider 34, adds to regular transmitted video or computerized signal 50, the following electronic information: a subset 56 of viewer attribute information 2a, encoded form 42c of sender requested electronic information 42a, and format information 58 for formatting sender requested electronic information 42a. Thus, internet service provider 34 transmits a compound video or computerized s, indicated in this description as internet service provider compound signal (50+56+42c+58).

TV station provider compound signal (48+52+42b+54) is transmitted by TV station provider 30 to viewer television 4, via electronic connection 38, or, alternatively, internet service provider compound signal (50+56+42c+58), is transmitted by internet service provider 34, to viewer television 4, via electronic connection 40. Following reception, positive recognition, and decoding of TV station provided encoded sender requested electronic information 42b, or of internet service provided encoded sender requested electronic information 42c, by electronic device 8, viewer television 4 opens a subwindow 60 within the display station for formatted display of sender requested electronic information 42a.

Figure 2:
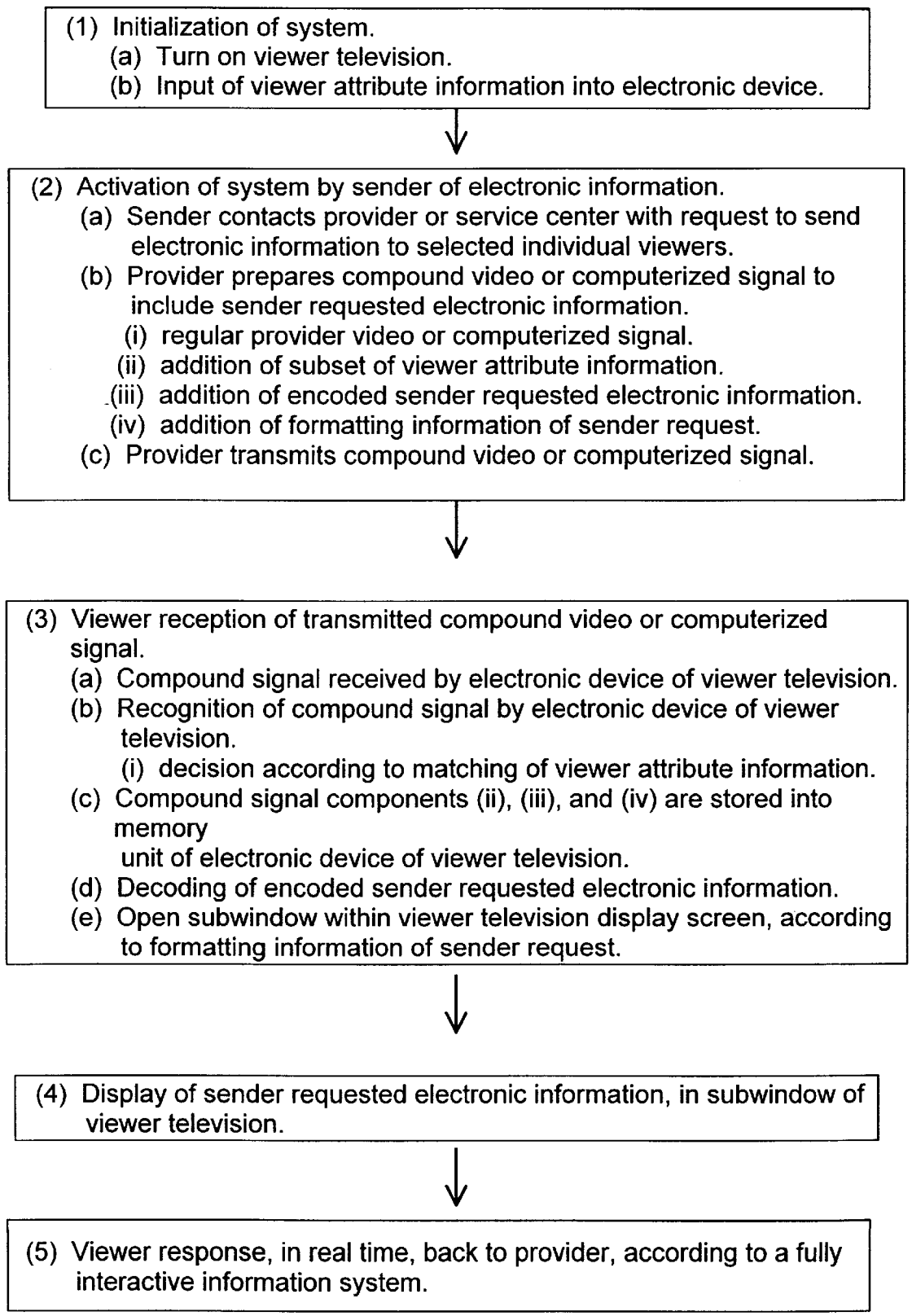
FIG. 2 is a flow diagram of a preferred embodiment of the method for providing service of sending real time electronic information to selected individual viewers of transmitted video or computerized signals according to the present invention.

FIG. 2 is a flow diagram of a preferred embodiment of the method, relating to the illustrated and described system of FIG. 1, for providing service of sending real time electronic information to selected individual viewers of transmitted video or computerized signals according to the present invention.

In FIG. 2, Step 1 features initialization of exemplary system 1. In step (a), viewer 2 turns on viewer television 4. In step (b), viewer 2 inputs viewer attribute information 2a into electronic device 8, via electronic connection 18. In an alternative preferred embodiment (not shown) of the method of the present invention, viewer 2 contacts service center 20, requesting to set up a service contract, with service center 20, for coordinating the service of receiving real time electronic information of transmitted video or computerized signals. Furthermore, in an alternative preferred embodiment (not shown) of the method of the present invention, viewer 2 contacts service center 20 via electronic connection 22 or electronic connection 24, and provides service center 20 with viewer attribute information 2a, such as CPU I.D. number 12, which is used as criterion by electronic device 8 to recognize encoded sender requested electronic information 42b or 42c, sent by TV station provider 30 or internet service provider 34. Viewer attribute information 2a may include detailed information such as names of viewers, locations of viewers, activities, lifestyles, likes, dislikes, habits, hobbies, viewer interests, pleasures, requests, specific needs, etc.

In Step 2, there is activation of system 1 by sender 42 of sender requested electronic information 42a. In step (a), sender 42 contacts TV station provider 30 via electronic connection 44, or internet service provider 34 via electronic connection 46, requesting to send electronic information 42a to selected individual viewer 2. In an alternative preferred embodiment (not shown) of the method of the present invention, sender 42 contacts service center 20, requesting to send electronic information 42a to selected individual viewer 2.

In step (b) of Step 2, provider 30 or 34 prepares a compound video or computerized signal, including sender requested electronic information 42a of sender 42. TV station provider 30 or internet service provider 34 includes sender requested electronic information 42a in addition to, and included with, regular transmission of video or computerized signals 48 or 50, respectively, to viewer 2. TV station provider 30, adds to (i) regular transmitted video or computerized signal 48, the following electronic information: (ii) a subset 52 of viewer attribute information 2a, (iii) encoded form 42b of sender requested electronic information 42a, and (iv) format information 54 for formating sender requested electronic information 42a. Alternatively, internet service provider 34, adds to (i) regular transmitted video or computerized signal 50, the following electronic information: (ii) a subset 56 of viewer attribute information 2a, (iii) encoded form 42c of sender requested electronic information 42a, and (iv) format information 58 for formatting sender requested information 42a. In step (c), TV station provider 30 transmits a compound video or computerized signal, indicated in this description as TV station provider compound signal (48+52+42b+54), to viewer television 4 via electronic connection 38, or alternatively, internet service provider 34 transmits a compound video or computerized signal, indicated in this description as internet service provider compound signal (50+56+42c+58), to viewer television 4 via electronic connection 40.

In Step 3, there is viewer reception of TV station provider compound signal (48+52+42b+54), or, alternatively, of internet service provider compound signal (50+56+42c+58), whereby each signal received includes sender requested electronic information 42a in coded form, i.e., as 42b or 42c, respectively.

In step (a), compound signal (48+52+42b+54), or, (50+56+42c+58), transmitted by TV station provider 30, or transmitted by internet service provider 34, respectively, is received by electronic device 8 of viewer television 4.

Step (b) involves a decision step (i), whereby software package 16, as part of electronic device 8, decides to recognize or not to recognize subset of viewer attribute information 52 or 56, respectively, corresponding to compound video or computerized signal sent by TV station provider 30 or internet service provider 34. If there is not recognition of subset of viewer attribute information 52, as part of compound video or computerized signal sent by TV station provider 30, or subset of viewer attribute information 56, sent by internet service provider 34, then viewer TV electronic device 8 does not accept encoded form of sender requested information 42b or 42c. Alternatively, if there is recognition of subset of viewer attribute information 52, as part of compound signal (48+52+42b+54) sent by TV station provider 30, or subset of viewer attribute information 56, as part of compound signal (50+56+42c+58) sent by internet service provider 34, viewer TV electronic device 8 accepts encoded form of sender requested information 42b or 42c.

In step (c), components of TV station provider compound signal, (ii) subject 52 of viewer attribute information 2a, (iii) encoded from 42b of sender requested electronic information 42a, and (iv) format information 54 for formatting sender requested electronic information 42a, are stored into memory unit 14 of electronic device 8, of viewer television 4. Alternatively, components of internet service provider compound signal, (ii) subset 56 of viewer attribute information 2a, (iii) encoded from 42c of sender requested electronic information 42a, and (iv) format information 58 for formatting sender requested electronic information 42a, are stored into memory unit 14 of electronic device 8, of viewer television 4.

In step (d), there is decoding of sender requested electronic information, according to decoding instructions provided by service center 20. Encoded from 42b, or encoded form 42c, of sender requested electronic information 42a, is decoded, according to decoding instructions provided by service center 20.

In step (e), there is opening of subwindow 60 within display device of viewer television 4, according to formating information 54 or 58, included in TV station or internet service provider compound video or computerized signal, (48+52+42b+54) or (50+56+42c+58), respectively.

In Step 4, sender requested electronic information 42a is displayed in subwindow 60 of viewer television 4, in formated form.

In Step 5, viewer 2 has the option of responding to sender requested electronic information 42a, by sending back a message to TV station provider 30, or sending back a message to internet service provider 34, via electronic connection 38 or via electronic connection 40, respectively. According to implementation of this option by viewer 2, the system and method for providing service real time electronic information to selected individual viewers of transmitted video or computerized signals of the present invention perform as a fully interactive information system.

While the invention has been described in conjunction with specific embodiments and examples thereof, it is evident that many alternatives, modifications and variants will be apparent to those skilled in the art. Accordingly, it is intended to embrace all such alternatives, modifications and variations that fall within the spirit and broad scope of the appended claims.

What is claimed is:

1. A system for a sender sending real time electronic information to a viewer of transmitted video signals, the system comprising:
    (a) viewer attribute information related to the viewer;
    (b) an electronic device included with and in communication with a television belonging to the viewer for receiving and storing said viewer attribute information input into said electronic device by the viewer;
    (c) sender requested electronic information of the sender to be transmitted by request of the sender to the viewer, said sender requested electronic information of the sender is included with a non-viewer provided subset of said viewer attribute information related to the viewer;
    (d) a service center for communicating to a television station provider of the transmitted video signals encoding instructions to form encoded sender requested electronic information of the sender, said television provider of the transmitted video signals transmits a compound video signal including said non-viewer provided subset of viewer attribute information and said encoded sender requested electronic information of the sender to said electronic device included with and in communication with said television belonging to the viewer, said electronic device makes a decision selected from the group consisting of accepting said encoded sender requested electronic information of the sender and not accepting said encoded sender requested electronic information of the sender, said decision of accepting said encoded sender requested electronic information is made by recognizing said non-viewer provided sheet subset of said viewer attribute information, and said electronic device decodes said encoded sender requested electronic information of the sender to form decoded sender requested electronic information of the sender; and
    (e) a subwindow within said television of the viewer for displaying said decoded sender requested electronic information of the sender to the viewer.

2. The system claim 1, wherein said electronic device included with and in communication with said television belonging to the viewer includes a central processing unit, a memory unit, and a software package.

3. The system of claim 1, wherein said viewer attribute information is selected from the group consisting of name of the viewer, location of the viewer, identification number of said television belonging to the viewer, identification number of said electronic device included with and in communication with said television belonging to viewer, activities, lifestyle, likes, dislikes, habits, hobbies, interests, pleasures, requests, and specific needs of the viewer.

4. The system of claim 1, wherein said electronic device included with and in communication with said television belonging to the viewer is used to format said decoded sender requested electronic information of the sender for display in said subwindow within said television belonging to the viewer.

5. The system of claim 1, wherein said television station provider of the transmitted video signals for transmitting said encoded sender requested electronic information of the sender to said electronic device included with and in communication with said television belonging to the viewer also performs functions of an internet service provider.

6. The system of claim 1, wherein physical location of said electronic device included with and in communication with said television belonging to viewer is selected from the group consisting of inside said television belonging to the viewer and outside of said television belonging to the viewer.

7. The system of claim 1, wherein the sender of said sender requested electronic information represents a plurality of senders of said sender requested electronic information viewer.

8. The system of claim 1, wherein said service center also performs functions of said television station provider of the transmitted video signals for transmitting said encoded sender requested electronic information of the sender to said electronic device included with and in communication with said television belonging to the viewer.

9. A method for a sender sending real time electronic information to a viewer of transmitted video signals, the method comprising the steps of:

(a) providing viewer attribute information related to the viewer;

(b) receiving and storing said viewer attribute information by an electronic device included with an in communication with a television belonging to the viewer, said viewer attribute information input into said electronic device by the viewer;

(c) providing sender requested electronic information of the sender to be transmitted by request of the sender to the viewer, said sender requested electronic information of the sender is included with a non-viewer provided subset of said viewer attribute information related to the viewer;

(d) providing a service center for communicating to a television station provider of the transmitted video signals encoding instructions to form encoded sender requested electronic information of the sender;

(e) transmitting a compound video signal including said non-viewer provided subset of viewer attribute information and said encoded sender requested electronic information of the sender by said television station provider of the transmitted video signals to said electronic device included with and in communication with said television belonging to the viewer;

(f) making a decision selected from the group consisting of accepting said encoded sender requested electronic information of the sender and not accepting said encoded sender requested electronic information of the sender by said electronic device included with and in communication with said television belonging to the viewer, whereby said decision by said electronic device accepting said encoded sender requested electronic information the sender is made by recognizing said non-viewer provided subset of said viewer attribute information;

(g) decoding said encoded sender requested electronic information of the sender by said electronic device included with and in communication with said television belonging to the viewer to form decoded sender requested electronic information of the sender;

(h) formatting said decoded sender requested electronic information of the sender by said electronic device included with and in communication with said television belonging to the viewer to form formatted decoded sender requested electronic information of the sender;

(i) opening up of a subwindow within said television belonging to the viewer; and (j) displaying said formatted decoder sender requested electronic information of the sender within said subwindow within said television belonging to the viewer.

10. The method of claim 9, wherein physical location of said electronic device included with and in communication with said television belonging to the viewer is selected from the group consisting of inside said television belonging to the viewer and outside of said television belonging to the viewer.

11. The method of claim 9, wherein said service center also performs functions of said television station provider of the transmitted video signals for transmitting said encoded sender requested electronic information of the sender to said electronic device included with and in communication with said television belonging to the viewer.

12. The method of claim 9, wherein said viewer attribute information is selected from the group consisting of name of viewer, location of the viewer, identification number of said television belonging to the viewer, identification number of said electronic device included with and in communication with said television belonging to the viewer, activities, lifestyle, likes, dislikes, habits, hobbies, interests, pleasures, requests, and specific needs of the viewer.

13. The method of claim 9, wherein the sender of said sender requested electronic information represents a plurality of senders and sender requested electronic information to the viewer.

14. The method of claim 9, wherein said electronic device included with and in communication with said television belonging to the viewer includes a central processing unit, a memory unit, and a software package.

15. The method of claim 9, wherein said television station provider of the transmitted video signal for transmitting said encoded sender requested electronic information of the sender to said electronic device included with and in communication with said television belonging to the viewer also performs functions of an internet service provider.

16. The method of claim 9, wherein the viewer of said sender requested electronic information of the sender replies back to said television station provider of the transmitted video signals.

* * * * *